(12) United States Patent
Wang et al.

(10) Patent No.: US 10,773,831 B2
(45) Date of Patent: Sep. 15, 2020

(54) INSTRUMENT LANDER UTILIZING A CUBESAT PLATFORM FOR IN SITU EXPLORATION OF ASTEROIDS AND COMETS

(71) Applicant: University of Southern California, Los Angeles, CA (US)

(72) Inventors: Joseph Jiong Wang, Rancho Palos Verdes, CA (US); Brian Parke Franz, Los Angeles, CA (US); Michael Gruntman, Rolling Hills Estates, CA (US)

(73) Assignee: University of Southern California, Los Angeles, CA (US)

(*) Notice: Subject to any disclaimer, the term of this patent is extended or adjusted under 35 U.S.C. 154(b) by 708 days.

(21) Appl. No.: 15/636,382

(22) Filed: Jun. 28, 2017

(65) Prior Publication Data
US 2017/0369191 A1    Dec. 28, 2017

Related U.S. Application Data

(60) Provisional application No. 62/355,755, filed on Jun. 28, 2016.

(51) Int. Cl.
*B64G 1/10* (2006.01)
*B64G 1/64* (2006.01)
*B64G 1/24* (2006.01)

(52) U.S. Cl.
CPC ............ *B64G 1/105* (2013.01); *B64G 1/244* (2019.05); *B64G 1/645* (2013.01); *B64G 2001/1071* (2013.01)

(58) Field of Classification Search
CPC .......... B64G 1/10; B64G 1/105; B64G 1/244; B64G 1/645
See application file for complete search history.

(56) References Cited

U.S. PATENT DOCUMENTS

| 8,353,481 B2 | 1/2013 | Rosen | |
|---|---|---|---|
| 2009/0206204 A1* | 8/2009 | Rosen | B64G 1/402 244/158.5 |
| 2014/0319283 A1* | 10/2014 | Holemans | B64G 1/641 244/173.3 |

(Continued)

OTHER PUBLICATIONS

Unkown Author, 6U CubeSat Design Specification Rev. Provisional, The CubeSat Program, Cal Poly SLO, May 20, 2016, 27 pages.

(Continued)

*Primary Examiner* — Justin M Benedik
(74) *Attorney, Agent, or Firm* — Fish & Richardson P.C.

(57) ABSTRACT

Methods, systems, and apparatus for designing, constructing and using instrument landers for in situ exploration of small solar system bodies, such as asteroids and comets. In one aspect, a lander includes a CubeSat-style platform; instrument packaging, wherein the CubeSat-style platform and the instrument packaging are configured and arranged for an uncontrolled descent, hopping landing on a surface of a body in a solar system, where a descending trajectory for the lander is designed based on gravitational force and solar radiation, with no lander-based propulsion; and a mobility mechanism configured and arranged to self-orient the lander on the surface of the body in the solar system.

19 Claims, 6 Drawing Sheets

(56) References Cited

U.S. PATENT DOCUMENTS

2016/0043800 A1* 2/2016 Kingsbury ......... H04B 7/18517
398/125
2016/0109501 A1 4/2016 Spark et al.
2016/0112117 A1 4/2016 Platzer et al.
2017/0073087 A1 3/2017 Clagett et al.

OTHER PUBLICATIONS

Unknown Author, CubeSat Design Specification (CDS) Rev. 13, The CubeSat Program, Cal Poly SLO, Apr. 6, 2015, 42 pages.
Ridenoure et al., "Small Spinning Landers for Solar System Exploration Missions", 28th Annual AIAA/USU Conference on Small Satellites, SSC14-III-4, Aug. 4, 2014, pp. 1-11.
Peters et al., "Design and Functional Validation of a Mechanism for Dual-Spinning CubeSats", Proceedings of the 42nd Aerospace Mechanisms Symposium, NASA Goddard Space Flight Center, May 14-16, 2014, pp. 523-536.

* cited by examiner

INSTRUMENT LANDER UTILIZING A CUBESAT PLATFORM FOR IN SITU EXPLORATION OF ASTEROIDS AND COMETS

CROSS-REFERENCE TO RELATED APPLICATIONS

This application claims the benefit under 35 U.S.C. § 119(e) of U.S. Patent Application No. 62/355,755, entitled "Instrument Lander Utilizing a CubeSat Platform for In Situ Exploration of Asteroids and Comets", filed Jun. 28, 2016, which is incorporated herein by reference in its entirety.

STATEMENT AS TO FEDERALLY SPONSORED RESEARCH

This invention was made with government support under Contract No. NNX15AL86G awarded by NASA (National Aeronautics and Space Administration). The government has certain rights in the invention.

BACKGROUND

This specification relates to systems and techniques for spacecraft, and in particular, for landers usable for in situ exploration of small asteroids and comets.

Currently, the in situ exploration of small bodies in the solar system (e.g. small asteroids and comets) requires very complex and expensive spacecraft and landers. As shown by the Rosetta/Philae mission, landing on a comet or a small asteroid is extremely difficult and risky. The few missions to the small asteroids and comets that have been carried out by NASA so far have all been extremely expensive flagship missions. Few alternative options currently exist.

SUMMARY

This specification describes technologies relating to spacecraft, and in particular, for landers usable for in situ exploration of small asteroids and comets.

A new lander design is described for delivering miniature instruments to the surface of small asteroids or comets. The miniature lander utilizes a CubeSat based platform, lands at the surface of small asteroids or comets via an uncontrolled descent and hopping landing method, and self-orients itself to allow the instrument it carries to perform in situ analysis. This lander design is low mass, low power, and low cost. This invention has the potential to enable an entirely new class of low cost planetary missions to small asteroids or comets.

The lander design includes a self-landing/self-orienting instrument landing package. To this point, a lander to a planetary body is foremost a spacecraft whose primary objective is to land and deploy the instrument as a payload. The payload is only a very small part of the spacecraft lander. In contrast, in this invention, the "instrument lander" is primarily an instrument (e.g., about half of the lander volume is the instrument). The supporting subsystems are kept at a minimum. In some implementations, CubeSat can be used as the instrument lander bus. CubeSats have not been used for planetary surface exploration missions in the Solar System. CubeSats have become increasingly popular for Earth-orbit sciences as well as beginning to branch into the deep space realm.

Further, the lander is designed to achieve a landing on a small asteroid or comet through an uncontrolled descent, hopping landing, and self-orienting at the surface. This will drastically reduce the complexity of both the lander design and landing operation, and thus significantly reduce the overall cost of an asteroid/comet mission. This approach is valid for small asteroids/comets where the gravitational force on an orbiting lander is weak, and is comparable to solar radiation pressure. Under such a condition, one may design a descending trajectory for an object ejected from an orbiting mother spacecraft completely based on the gravitational force and the solar radiation to achieve a soft-landing. Hence, no retropropulsion (typically the most expensive and complex part of any lander) is required. Hence the descent is "uncontrolled". Upon impact, the object will bounce around and eventually settle on the surface. Hence, the landing is a "hopping" landing determined by surface interactions between the lander and the asteroid surface. Once landed, the configuration and the internal flywheel system can self-orient the lander to the desired orientation on the surface (e.g., based on a set reorientation protocol and/or based on output from one or more orientation sensors, such as accelerometers and gyroscopes). The reduction of the complexity and cost is achieved through the use of a CubeSat platform and the elimination of retropropulsion and the related navigation and control systems on the lander.

In general, one or more aspects of the subject matter described in this specification can be embodied in a lander for in situ exploration of solar system bodies, the lander including: a CubeSat-style platform; instrument packaging, wherein the CubeSat-style platform and the instrument packaging are configured and arranged for an uncontrolled descent, hopping landing on a surface of a body in a solar system, where a descending trajectory for the lander is designed based on gravitational force and solar radiation, with no lander-based propulsion; and a mobility mechanism configured and arranged to self-orient the lander on the surface of the body in the solar system.

In some implementations, the instrument packaging makes up at least half of the volume of the lander. In some implementations, the lander has a 2 U CubeSat configuration. In some implementations, the lander has a 3 U CubeSat configuration. In some implementations, the lander has a 1.5 U CubeSat configuration.

The mobility mechanism can include a motor and a flywheel. In some implementations, the lander includes: an accelerometer; and a data processing apparatus communicatively coupled with the accelerometer and with the motor, the data processing apparatus including a computer-readable medium encoding instructions that cause the lander to detect settling in a landing position using data from the accelerometer, and that cause the lander to operate the motor to pivot the lander from a first face of the lander to at least a second face of the lander responsive to detection of the settling.

In some implementations, the lander includes a gyroscope communicatively coupled with the data processing apparatus, and the instructions include instructions that cause the lander to detect an orientation of the lander using data from the gyroscope, and that cause the lander to operate the motor to pivot the lander in accordance with the detected orientation. In some implementations, the mobility mechanism includes a flywheel brake communicatively coupled with the data processing apparatus, and the instructions include instructions that cause the lander to detect whether or not a current orientation is on a rectangular face of the lander, that cause the lander to operate the motor and the flywheel brake to cause the lander to hop to a new orientation when the current orientation is not on a rectangular face of the lander, and that cause the lander to operate the motor to cause the lander to pivot the lander when the current orientation is on a rectangular face of the lander that is not a correct orientation for the lander.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

To a large extent, the challenges of in situ exploration of small asteroids and comets come from the requirement of the science instrument and landing technology, which dictate the size, mass, and cost of the spacecraft and lander. This invention provides a new design of a miniature instrument lander to small asteroids or comets. The proposed lander can use a CubeSat based bus, lands at the surface of small asteroids or comets via a uncontrolled descent and hopping landing method, and self-orients itself to allow the instrument it carries to perform in situ analysis. This lander design is low mass, low power, and inexpensive. This invention has the potential to enable an entirely new class of low cost exploration missions to small asteroids or comets.

Figure 1:
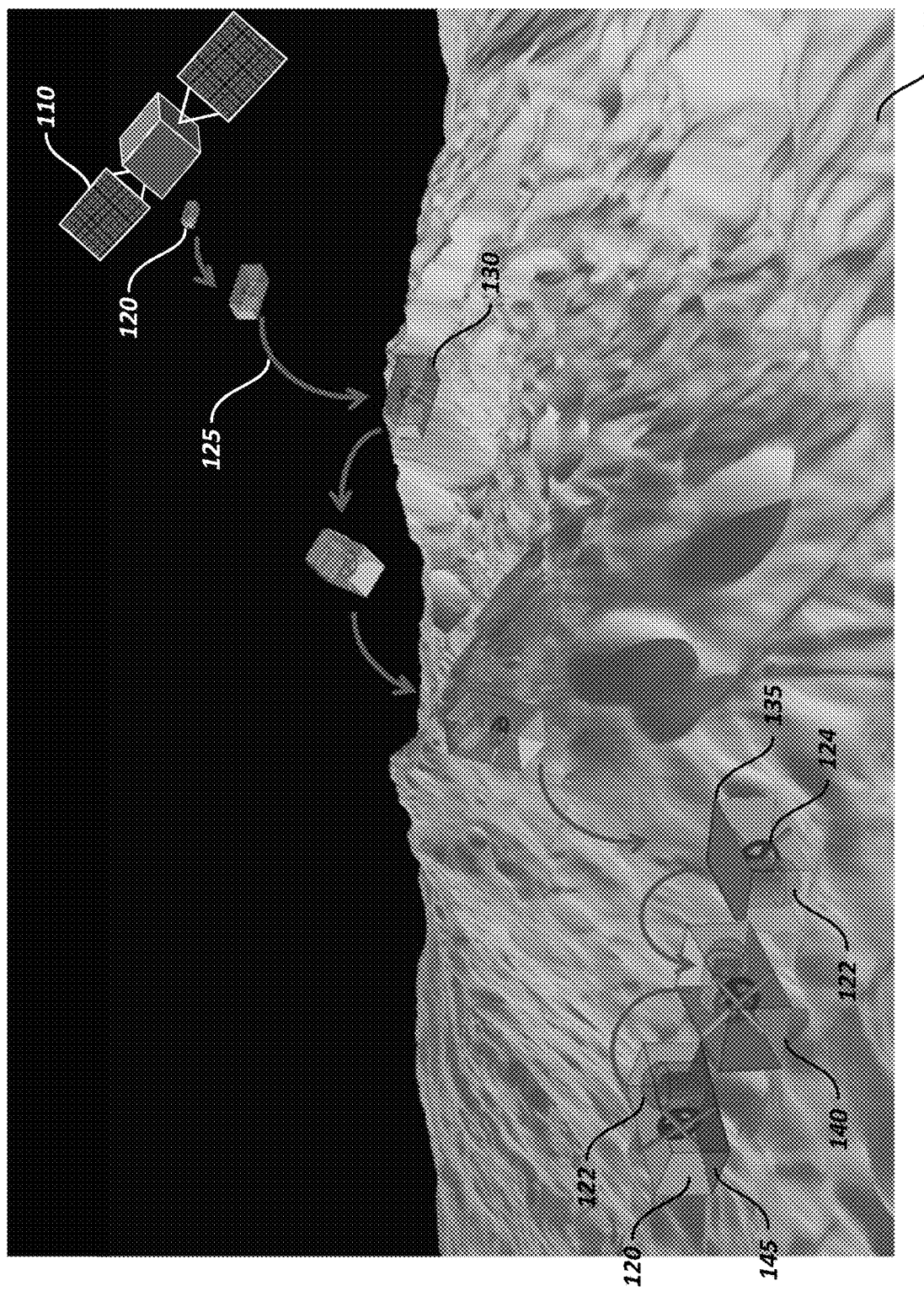
FIG. 1 shows a miniature instrument lander in an operational environment in which an instrument package is delivered for in situ exploration of a small body in the solar system.

FIG. 1 shows a miniature instrument lander 120 in an operational environment in which an instrument package 122 is delivered for in situ exploration of a small body 100 in the solar system. The small body 100 can be an asteroid, comet, or other body in space that is small enough that the body's gravitational force on the instrument lander 120 is weak, e.g., the gravitational force is comparable to solar radiation pressure on the instrument lander 120. Under such conditions, no retropropulsion is required for the instrument lander. The instrument lander 120 is released from an orbiting mother spacecraft 110, where the spacecraft 110 is designed and constructed to release the instrument lander 120 to the body 100 in an uncontrolled descent 125.

The descending trajectory of the instrument lander 120 to the small body 100 can be determined completely by the gravitational force of the body 100 and the solar radiation pressure. The solar radiation pressure will slow the instrument lander 120 during at least a portion of the descending trajectory to slow the uncontrolled descent 125, thus helping to achieve a semi-soft-landing for the instrument lander 120. The location to release the instrument lander 120 in the orbit of the spacecraft 110 is determined by the descending trajectory 125 in accordance with the gravitational force of the body 100, the total mass of the instrument lander 120, the intensity of the solar radiation pressure on instrument lander 120, and the orbit of the spacecraft 110. The release point and the descending trajectory 125 can be determined through orbital dynamic calculations, which can be performed by a program running on a control computer system installed in the spacecraft 110.

In some implementations, the design utilizes a CubeSat-style platform as the lander bus. While gaining popularity in recent years, CubeSats have not generally been considered as platforms for planetary exploration. Further details relating to CubeSat and lander technologies are described in: (1) the CubeSat Design Specification, Revision 13, Updated Apr. 6, 2015; (2) the 6 U CubeSat Design Specification, Provisional, Updated May 20, 2016; (3) Ridenoure et al., "Small Spinning Landers for Solar System Exploration Missions", published in August 2014 at the 28th Annual AIAA/USU Conference on Small Satellites; (4) U.S. Patent Pub. No. 2016/0043800, filed Aug. 4, 2015, published Feb. 11, 2016, and entitled "DESIGN OF A FREE-SPACE OPTICAL COMMUNICATION MODULE FOR SMALL SATELLITES"; (5) U.S. Patent Pub. No. 2016/0109501, filed Oct. 15, 2014, published Apr. 21, 2016, and entitled "BACK-PLANE CONNECTOR FOR CUBESAT"; (6) U.S. Patent Pub. No. 2016/0112117, filed Oct. 15, 2014, published Apr. 21, 2016, and entitled "SATELLITE OPERATING SYSTEM, ARCHITECTURE, TESTING AND RADIO COMMUNICATION SYSTEM"; (7) U.S. Pat. No. 8,353,481, issued Jan. 15, 2013, and entitled "SPIN-STABILIZED LANDER"; and each of these published documents is hereby incorporated by reference in its entirety.

As noted, the lander 120 relies on an uncontrolled descent and hopping landing. As shown in FIG. 1, the instrument lander 120 will impact 130 the body 100 and hop at least once before settling in a landing position on the body 100. The instrument lander 120 does not rely on retropropulsion as a deceleration mechanism, which is typically one of the most expensive and complex parts of ballistic landings on planetary bodies. However, due to the uncontrolled descent, the exact orientation of the lander 120 at the landing position cannot be known in advance with any certainty.

In the example shown, the lander 120 has come to a rest in an upside down orientation 135, where the instrument package 122 is not in the correct orientation for use on the body 100. To address this issue, the lander 120 is designed and constructed with an internal mobility mechanism 124 that allows the lander 120 to pivot (potentially through one or more intermediate orientations 140) to the final proper orientation 145 for instrumentation operation. In some implementations, the lander 120 can be designed and programmed to self-orient to the desired orientation on the surface based on a set reorientation protocol, e.g., so as to point a sensor of instrument package 122 in a particular direction.

In some implementations, the lander 120 can be designed and constructed to include one or more orientation sensors, such as accelerometers and gyroscopes, which sensors can be included in the instrument package 122, in the mobility mechanism 124, and/or other parts of the lander 120, and the lander 120 can be designed and programmed to self-orient to the desired orientation on the surface based on output from the sensor(s). Further, the lander 120 can include a data processing apparatus including a computer-readable medium (e.g., in a designated electronics bay, or in another location, in the lander 120) encoding instructions corresponding to the programming noted above. Thus, the spacecraft 110 and the instrument lander 120 are designed and constructed to enable the instrument lander 120 to land and orient the instrument package 122 for operations on the target small body's surface.

Figure 2A:
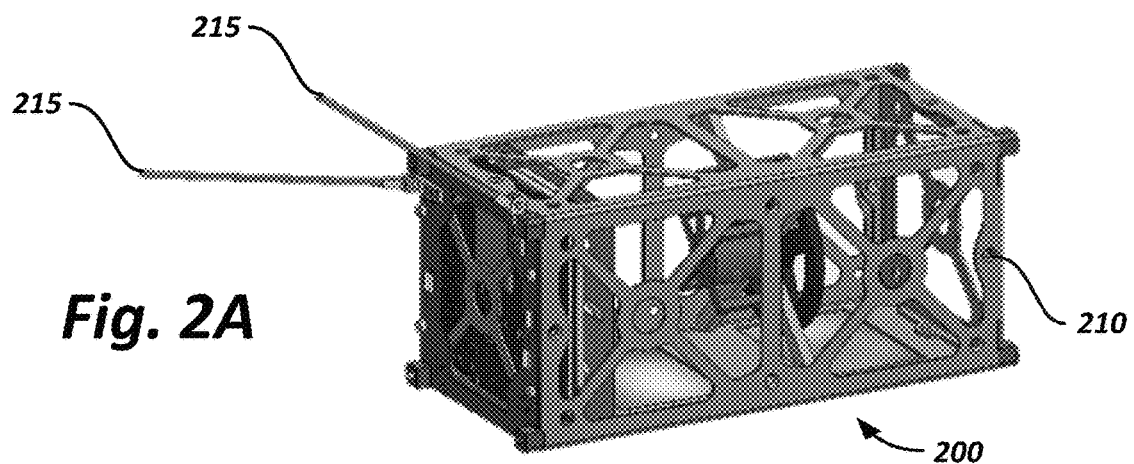
FIGS. 2A & 2B show examples of miniature instrument landers in accordance with the present invention.

FIG. 2A shows an example of a miniature instrument lander 200. The instrument lander 200 is designed and constructed to use a CubeSat-style housing or chassis 210 and also to have one or more antennas 215 for transmission of data and general communication. In the example shown, the instrument lander 200 is a 2 U CubeSat structure, which is about 20×10×10 cm. In general, the instrument lander 200 can be designed and constructed to conform to a standardized satellite form factor that specifies a first length for each of a width and a height of the satellite form factor, and that specifies a second length for a depth of the satellite form factor, where the second length is longer than the first length.

In the case of a 2 U CubeSat structure, note that the dimensions need not be exactly 20×10×10 cm. For example, the depth dimension need not be exactly 20 cm, but rather can be within 15% or 20% of this length. In some implementations, the instrument lander 200 has a height of 10 cm, a width of 10 cm, and a depth of 22.7 cm, thus resulting in a total volume of 2270 $cm^3$. In the case of a 3 U CubeSat structure, the depth dimension can be within 15% or 20% of 30 cm. For example, the instrument lander 200 can have a height of 10 cm, a width of 10 cm, and a depth of 34.05 cm, thus resulting in a total volume of 3405 $cm^3$. In the case of a 1.5 U CubeSat structure, the depth dimension can be within 15% or 20% of 15 cm. For example, the instrument lander 200 can have a height of 10 cm, a width of 10 cm, and a depth of 17.02 cm, thus resulting in a total volume of 1702 $cm^3$. Note that using CubeSat dimensions allows the use of commercial off-the-shelf CubeSat products instead of building customized chasses for instrument landers, which lowers overall costs. Nonetheless, other satellite form factors are also possible, including different lengths for the height and width dimensions.

Figure 2B:
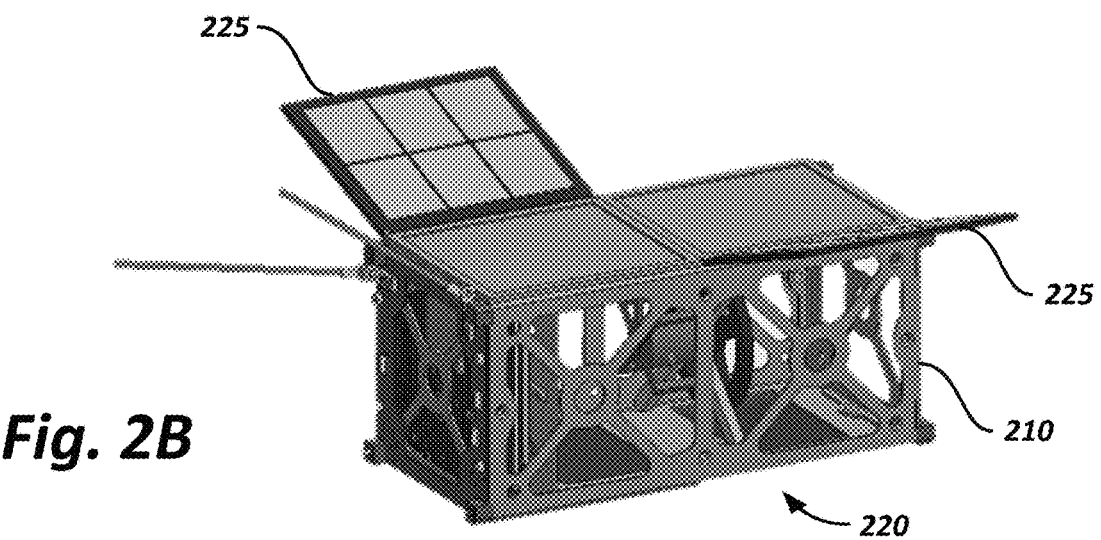

In addition, depending on the power requirements of the instrumentation to be carried in the instrument lander 200, the instrument lander can rely on difference power sources, such as batteries, fuel cells, or solar cells (mounted on the body or on a panel), or a combination of such systems and sources for electric power. FIG. 2B shows another example of a miniature instrument lander 220. The miniature instrument lander 220 includes a CubeSat-style chassis 210, as described above, but also includes solar panels 225. The solar panels 225 can be folded against the instrument lander 220 during launch, delivery, and the uncontrolled descent. Then, once the instrument lander is properly oriented on the surface of the target body, the solar panels 225 can be deployed by activating a mechanical joint (as shown in FIG. 2B) to receive impinging solar radiation and generate electric power for the instrumentation.

Figure 3:
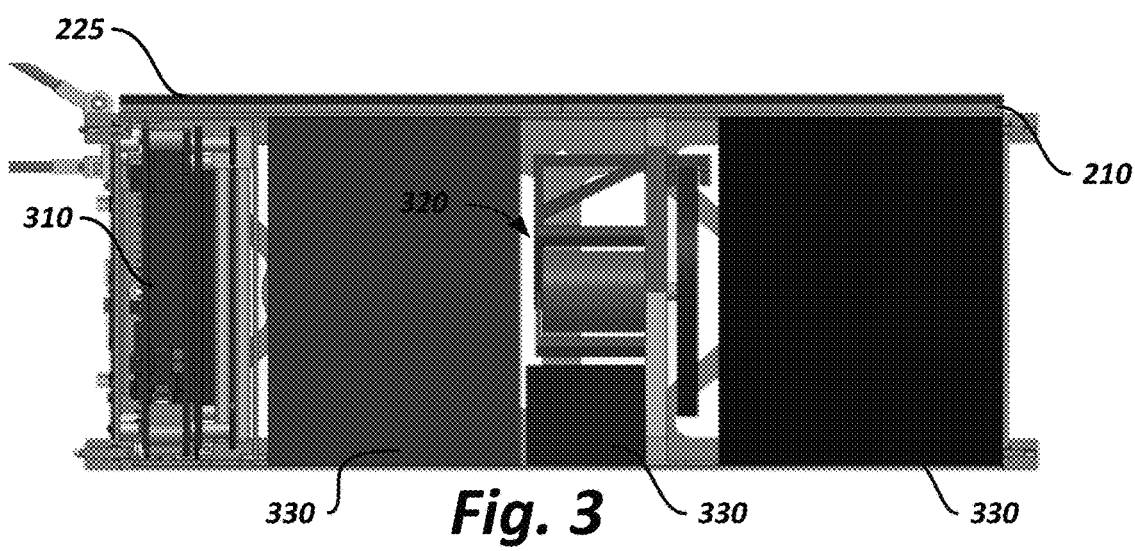
FIG. 3 shows a section view of the miniature lander of FIG. 2B.

FIG. 3 shows a section view of the miniature lander 220 of FIG. 2B, including the solar panels 225 in their retracted position and the CubeSat-style chassis 210. Also shown in FIG. 3 are an electronics bay 310 and a mobility mechanism 320. The electronics bay 310 includes at least one battery and processing electronics for power and control operations. For example, the electronics bay 310 can house a motherboard, a power processing module, and a power system with two Lithium-ion batteries. The mobility mechanism 320 can be a flywheel mobility mechanism, such as described in further detail below, but other mobility mechanisms are also possible. Note that the mobility mechanism 320 need not be located in the center of the lander 220, and in the case of a flywheel mobility mechanism, the positioning within the lander 220 will depend on the mass distribution within the lander 220.

As shown in FIG. 3, multiple volumes 330 are available for varying instrumentation packaging requirements for varying mission applications. The space allotted for the instrumentation packages can depend on the desired "ground truth" surface analyses (i.e., surface analysis performed directly on the ground, such as in situ surface composition analysis). Note that the 2 U shape was selected here over a 1 U or 1.5 U configuration due to (1) the volumetric advantage it provides for variation of instrumentation packages and (2) the geometrical advantages it provides during the rebound and settling process.

The 2 U size allows for a larger amount of volumetric space than a 1 U or 1.5 U configuration. The purpose of the allotted volume is to allow for the self-landing and self-orienting design to be applicable to numerous variations of instrument packages depending on the desired ground truth analyses. In general, the total volumetric space available for instrumentation packages (e.g., volumes 330) should be at least 60%, at least 55%, at least 50%, or at least 45% of the total volume of the instrument lander (e.g., the total volume of the lander 220). In the example shown, the total volumetric space of the volumes 330 is on the order of 1.25 U (1250 $cm^3$), which is 62.5% of a 20×10×10 cm CubeSat-style lander chassis 210. Within these volumes 330, numerous instrumentation package variations can be implemented for a single baseline design. The number of additional payloads will also vary depending on the size of each additional payload.

Figure 4A:
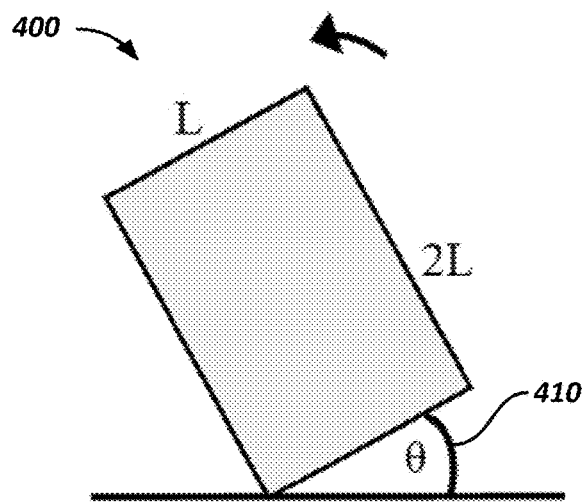
FIGS. 4A & 4B compare inclination angles needed to achieve a tipping motion for instrument landers having different form factors.
Figure 4B:
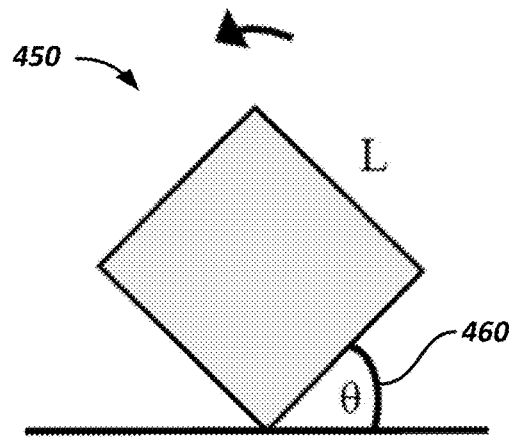

The 2 U shape (as well as a 3 U shape) also has a much higher probability to land on one of the four rectangular faces rather than in a vertical orientation on one of the two square faces. This is due partially to the larger surface area of the rectangular faces as compared to the square ones but also because the inclination angle needed to achieve a tipping motion is smaller due to the elongated moment arm created during the tipping process. FIG. 4A shows an inclination angle 410 needed to achieve a tipping motion for instrument lander 400 having a 2 U CubeSat form factor, and FIG. 4B shows an inclination angle 460 needed to achieve a tipping motion for instrument lander 450 having a 1 U CubeSat form factor. This visual comparison of the 2 U lander 400 with the 1 U lander 450 shows that the inclination angle 410 needed to tip the lander 400 onto its 2 L side (the dimension that is twice the length, L, of the other two dimensions of the lander 400) is less than the inclination angle 460 needed to tip the lander 450 over from one side to another.

By having the lander oriented on the rectangular face, the instrumentation package can be normal to any of the four surfaces, and the internal mobility mechanism can be relied upon to pivot the lander over the long edges until proper orientation is achieved. Once successfully settled on the surface on a rectangular face, the lander's mobility mechanism enables the lander to correct the lander's orientation for operation of the lander's instrumentation. Further, in some implementations, if the lander settles on one of its two square faces, the lander can use its mobility mechanism to generate a hopping motion to reorient the lander, as described in further detail below. Due to the elongated moment arm of the lander, e.g., a 2 U or 3 U CubeSat lander, it is likely to take very few (sometimes just one) such hopping motions to reorient the lander to one of its four rectangular faces.

Figure 5:
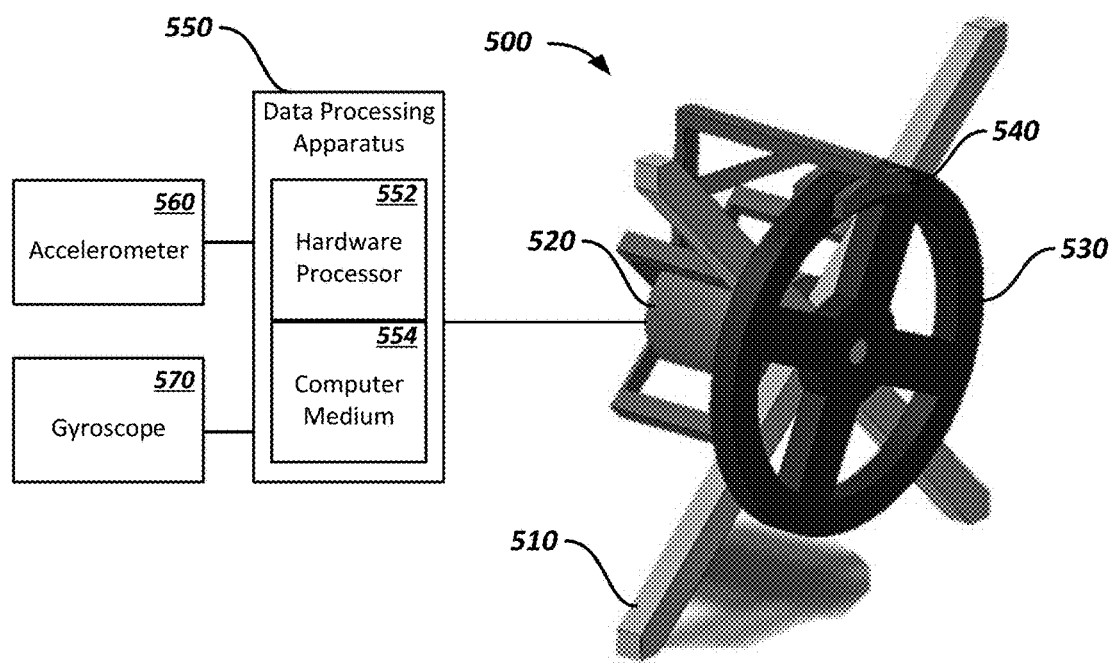
FIG. 5 shows an example of a mobility mechanism useable in a miniature instrument lander in accordance with the present invention.

FIG. 5 shows an example of a mobility mechanism 500 useable in a miniature instrument lander. The mobility mechanism 500 includes a frame 510, a motor 520, and a flywheel 530. The frame 510 holds the motor 520 and the flywheel 530 in place within the lander, and the motor 520, e.g., a DC (direct current) motor, is used to drive the flywheel 530. The flywheel 530 (which is internal to the lander) is used to generate torque that provides mobility once the lander is on the surface of the body. In some implementations, the motor 520 only turns the flywheel 530 in one direction. In other implementations, the motor 520 is designed to turn the flywheel 530 in either direction. In either case, a flywheel type mobility mechanism 500 will generally be less complicated to implement than other types mobility mechanisms, thereby lowering costs.

In some implementations, a data processing apparatus 550 is programmed to operate the motor 520 to drive the flywheel 530 responsive to data received from an accelerometer 560 and a gyroscope 570. The accelerometer 560 can provide data indicating when the lander has come to a rest, and the data processing apparatus 550 can be programmed to wait until the lander is at rest before checking its orientation. Further, the gyroscope 570 can provide data indicating a current orientation of the lander once it is at rest, and the data processing apparatus 550 can be programmed to use this data to determine in which direction to pivot the lander. Note that the data processing apparatus 550 includes at least one hardware processor 552 and at least one computer-readable medium 554, and can be referred to as a data processing unit 550. However, while typical implementations will use a microprocessor unit, no particular computer processor architecture is required, aside from the desirability of reducing the total mass of the lander.

In some implementations, the data processing apparatus 550 can be programmed in a manner that generates movement in two modes: (1) a hopping motion, and (2) a pivoting motion. Since the surface of small bodies in the Solar System are generally not well-known, there is the possibility of settling on the surface in a tilted manner, e.g., if the instrumentation package were to come to rest on a rock. In some implementations, the mobility mechanism 500 also includes a brake 540 to provide additional torque capability, as needed. The brake 540 can be used to generate additional torque to "hop" to another location in order to successfully settle on a rectangular face of the housing. Once properly settled, the braking mechanism will typically no longer be needed as the rotation of the flywheel alone will typically provide enough torque to pivot the instrumentation package to the correct rectangular face for operation, although in some cases the brake 540 can also be used during a pivot operation.

Figure 6:
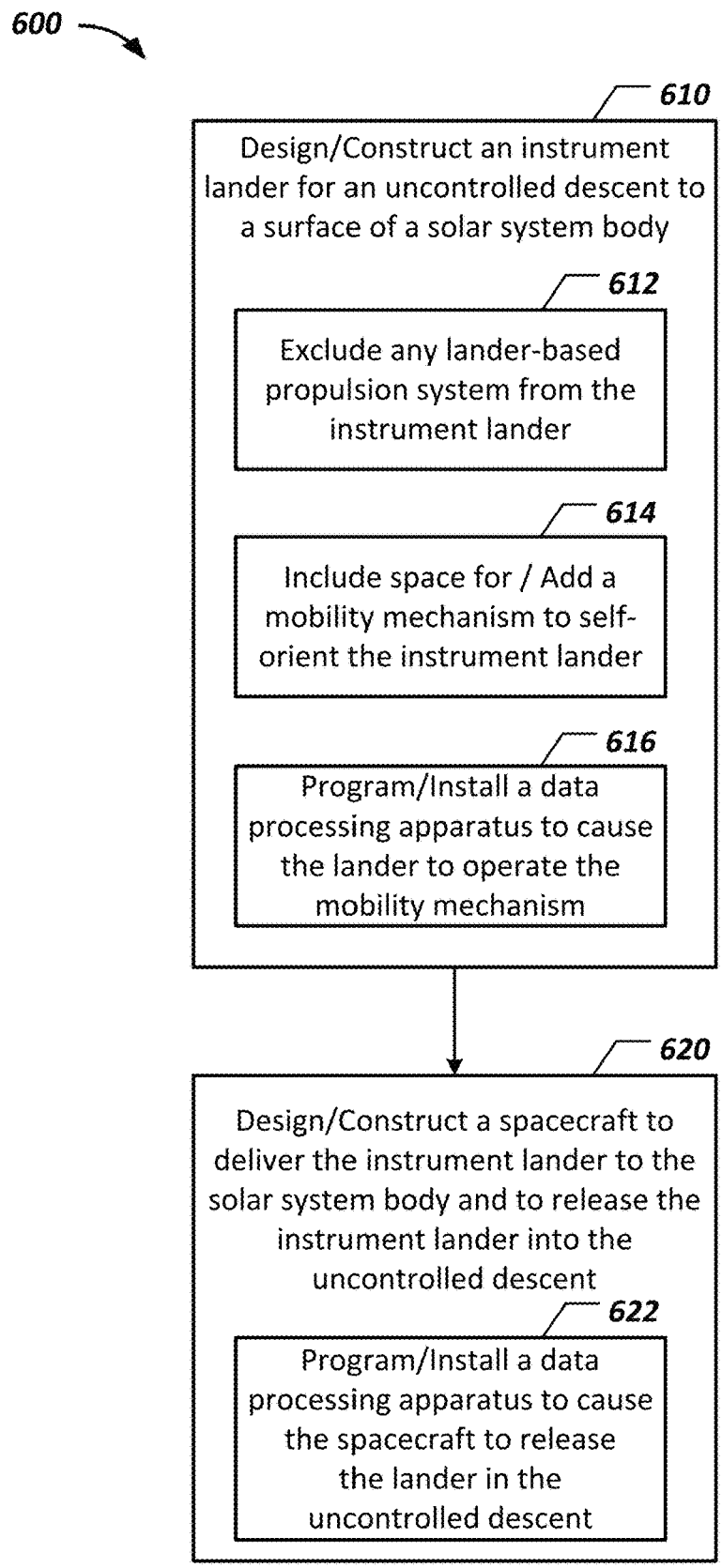
FIG. 6 shows an example of a process of designing and constructing an instrument lander and a spacecraft to deliver the instrument lander to a solar system body.

FIG. 6 shows an example of a process 600 of designing and/or constructing an instrument lander and a spacecraft to deliver the instrument lander to a solar system body. The instrument lander is designed 610, constructed 610, or both, for an uncontrolled descent to a surface of a solar system body. This designing 610 of the instrument lander involves excluding 612 any lander-based propulsion system from the instrument lander, as described above. Likewise, constructing 610 the instrument lander also involves excluding 612 any lander-based propulsion system from the instrument lander.

Further, the designing 610 of the instrument lander involves including 614 a space within the instrument lander for a mobility mechanism configured and arranged to self-orient the instrument lander on the surface of the solar system body, as described above. Likewise, constructing 610 the instrument lander involves adding 614 to the instrument lander a mobility mechanism configured and arranged to self-orient the instrument lander on the surface of the solar system body.

In some implementations, designing and/or constructing 610 the instrument lander involves programming 616 the lander to perform operations as detailed above, and also as detailed below in connection with FIG. 7B. During construction 610, this can include installing 616 a data processing apparatus including a computer-readable medium encoding instructions that cause the instrument lander to perform the described operations. Moreover, the instrument lander can be designed and/or constructed 610 to conform to a satellite form factor that specifies particular dimensions, such as described above in connection with CubeSat implementations.

For example, designing/constructing 610 the instrument lander can involve building the instrument lander to conform to a satellite form factor that specifies a first length for each of a width and a height of the satellite form factor, and that specifies a second length for a depth of the satellite form factor, wherein the second length is longer than the first length, and a total volume of the first length squared times the second length is less than or equal to 3405 cubic centimeters. As another example, designing/constructing 610 the instrument lander can involve building the instrument lander to conform to a satellite form factor that specifies a first length for each of a width and a height of the satellite form factor, and that specifies a second length for a depth of the satellite form factor, wherein the second length is longer than the first length, and a total volume of the first length squared times the second length is less than or equal to 2270 cubic centimeters. In some implementations, designing/constructing 610 the instrument lander involves conforming the instrument lander to a satellite form factor other than those noted above.

The process 600 can also include designing and/or constructing 620 a spacecraft to deliver the instrument lander to the solar system body and to release the instrument lander in a descending trajectory to the solar system body based on a gravitational force of the solar system body and solar radiation that serves to slow the instrument lander during at least a portion of the descending trajectory to slow the uncontrolled descent. In some implementations, designing and/or constructing 620 the spacecraft involves programming 622 the spacecraft to perform operations as detailed above, and also as detailed below in connection with FIG. 7A. During construction 620, this can include installing 622 a data processing apparatus including a computer-readable medium encoding instructions that cause the spacecraft to perform the described operations.

Figure 7A:
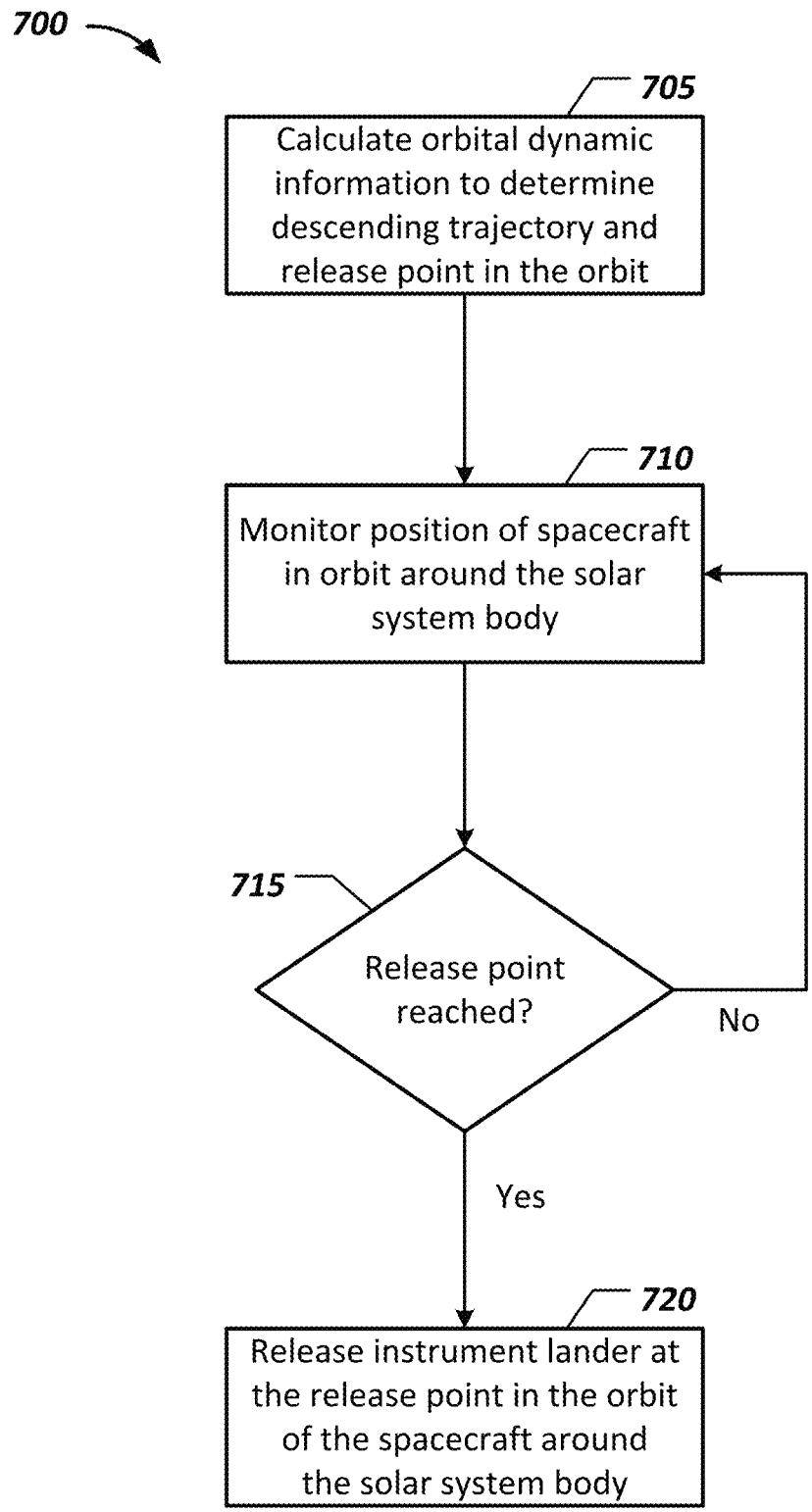
FIGS. 7A-7B show examples of processes of operating a spacecraft to deliver an instrument to a solar system body and operating the instrument lander to put it into a proper orientation on the surface of the solar system body.

FIG. 7A shows an example of a process 700 of operating a spacecraft to deliver an instrument to a solar system body. Orbital dynamic information for the spacecraft is calculated 705 to determine the descending trajectory and a release point for the instrument lander. The release point in the orbit of the spacecraft around the solar system body can be determined in accordance with the gravitational force of the solar system body, a total mass of the instrument lander, and an intensity of the solar radiation. In some implementations, and now referring to FIG. 1, the spacecraft 110 determines the release point by the descending trajectory 125 in accordance with the gravitational force of the body 100, the total mass of the instrument lander 120, the intensity of the solar radiation pressure on instrument lander 120, and the orbit of the spacecraft 110.

For example, the spacecraft 110 can monitor 710 its position in orbit around the solar system body 100. This monitoring 710 can continue a check 715 determines that the release point has been reached. Then, the instrument lander is released 720 at the release point in the orbit of the spacecraft around the solar system body. Note that the lander need not be in any particular orientation upon release since the release and descent may be considered as simply throwing the lander 120 out of the spacecraft 110.

Figure 7B:
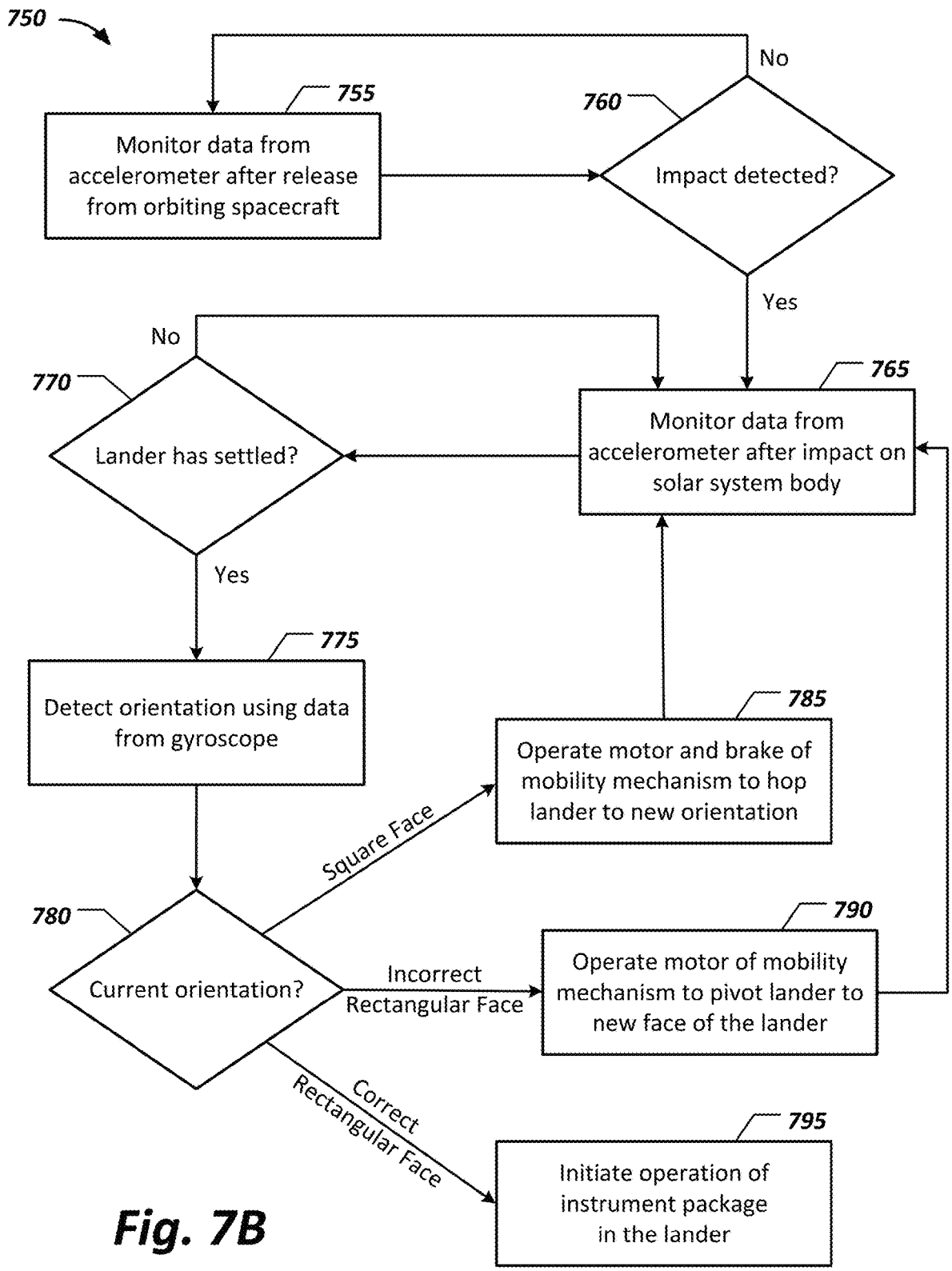

FIG. 7B shows an example of a process 750 of operating an instrument lander to put it into a proper orientation on the surface of a solar system body. Data from an accelerometer in the instrument lander is monitored 755 after release of the lander from the orbiting spacecraft. This monitoring 755 can be ongoing, where a threshold acceleration level is used to detect impact on the surface of the body. Note that the threshold can be set based on the gravitational force of the body, the total mass of the lander, and the altitude of the spacecraft (above the body's surface) where the release occurred.

Once impact is detected 760, data from the accelerometer in the instrument lander is then monitored 765 to detect when the lander has settled on the surface of the body. This can involve a check 770 as to whether the acceleration has been zero (or essentially zero) for a period of time. The period of time can be set based on the gravitational force of the body and the total mass of the lander. In addition, in some implementations, the current orientation of the lander (as determined by data from an onboard gyroscope) is also used in the detection 770 of lander settling. For example, the gyroscope data can affect the period of time in that a longer period of time may be desirable when the lander comes to rest in an orientation that is substantially skewed (e.g., more than thirty degrees off) from any one of the landers six faces, and/or a longer period of time may be desirable when the lander comes to rest on one of the lander's two square faces.

When the lander is settled, the orientation of the lander is detected 775 using data from the gyroscope in the lander. A check 780 of the current orientation determines the next course of action by the lander. When the lander has settled on one of the lander's two square faces (i.e., the current orientation is not on a rectangular face of the instrument lander), the lander operates the motor and brake of the lander's flywheel mobility mechanism to hop the instrument lander to a new orientation. This involves spinning up the flywheel using the motor to generate angular momentum, and then clamping the flywheel with the brake to force the angular momentum of the flywheel to transfer to the lander as a whole. In some implementations, the motor can turn the flywheel in either direction, and the direction selected can be based in part on the current orientation of the lander, and whether the lander is considered to have come to rest on a substantially angled surface of the body, as described further below.

The determination that the lander needs to hop 785 need not be a determination that the lander is exactly flat on one of the lander's two square faces. Rather, the lander can be programmed to compare the current orientation with one or more angles, such as angles determined based on inclination angle 410 and inclination angle 460. If the lander's orientation is substantially less than an inclination angle that should cause the lander to tip over (e.g., the angle of the lander is less than or equal to thirty degrees off from any one of the lander's six faces) then the lander can be considered to be on the corresponding face that is closest to this orientation. If this face is one of the lander's two square faces, then a hop 785 is needed.

In addition, in some implementations, the lander may determine that a hop is needed even if the lander is not determined to be on one of the lander's two square faces. For example, if the lander's orientation is at an angle that is more than the substantially flat angle (e.g., more than thirty degrees off from any one of the lander's six faces) then the lander can be considered to have come to rest on a substantially angled surface of the body, and so a hop 785 can be performed to move the lander to a new location. In any case, after a hop 785, the lander returns to monitoring 765 data from the accelerometer to detect 770 when the lander has settled again.

When the check 780 determines that the lander has come to rest on one of the lander's four rectangular faces that is not the correct rectangular face for the instrument package, i.e., an incorrect rectangular face, then the lander operates 790 at least the motor of the mobility mechanism to pivot the instrument lander. This involves spinning up the flywheel using the motor to generate angular momentum that pivots the lander onto a new face. As before, the determination 780 that the current orientation is on a rectangular face of the lander that is not a correct orientation for the instrument lander can involve comparison to a threshold angle (e.g., thirty degrees) to determine the lander is near enough to flat to consider the lander to be on the corresponding face. In addition, in some implementations, the lander operates the brake in addition to the motor to effect the pivot 790.

Further, when the motor can be operated in either direction, the direction selected for the motor operation, and thus the direction to pivot the lander, can be determined based on the current orientation. For example, if the lander comes to rest on a slightly angled surface of the body (e.g., a surface that is more than sixty degrees off from gravitational normal, which may not point to the exact center of the body, depending on the distribution of mass within the body) then it may be preferable to pivot the lander down the hill rather than up the hill. In any case, after a pivot 790, the lander returns to monitoring 765 data from the accelerometer to detect 770 when the lander has settled again.

Once the lander's current orientation is determined 780 to have arrived at the lander's correct rectangular face, the lander initiates 795 operation of the instrument package in the lander. As before, the determination 780 that the current orientation is on a rectangular face of the lander that is the correct orientation for the instrument lander can involve comparison to a threshold angle (e.g., thirty degrees) to determine the lander is near enough to flat to consider the lander to be on the corresponding face. In addition, in some implementations, the specifics of the instrument package may determine the necessary orientation and thus the acceptable angle. For example, the instrument package within the lander may require that the lander come to rest at an angle that is approximately perpendicular to gravitational normal (e.g., within five degrees of completely flat on the correct rectangular face), and so a reduced threshold angle can be used to determine that the lander is on the correct rectangular face, and a series of pivots 790 and/or hops 785 can be performed until a flat enough location is found for the lander's instrument package.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc, or an embedded system. The computer-readable medium can be acquired separately and later encoded with the one or more modules of computer program instructions, such as by delivery of the one or more modules of computer program instructions over a wired or wireless network. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device. Devices suitable for storing computer program instructions and data include all forms of nonvolatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A lander for in situ exploration of solar system bodies, the lander comprising:
    a CubeSat-style platform;
    instrument packaging, wherein the CubeSat-style platform and the instrument packaging are configured and arranged for an uncontrolled descent, hopping landing on a surface of a body in a solar system, where a descending trajectory for the lander is designed based on gravitational force and solar radiation, with no lander-based propulsion; and
    a mobility mechanism configured and arranged to self-orient the lander on the surface of the body in the solar system.

2. The lander of claim 1, wherein the instrument packaging makes up at least half of the volume of the lander.

3. The lander of claim 2, wherein the lander has a 2 U CubeSat configuration.

4. The lander of claim 1, wherein the mobility mechanism comprises a motor and a flywheel.

5. The lander of claim 3, wherein the lander comprises:
an accelerometer; and
a data processing apparatus communicatively coupled with the accelerometer and with the motor, the data processing apparatus including a computer-readable medium encoding instructions that cause the lander to detect settling in a landing position using data from the accelerometer, and that cause the lander to operate the motor to pivot the lander from a first face of the lander to at least a second face of the lander responsive to detection of the settling.

6. The lander of claim 5, wherein the lander comprises a gyroscope communicatively coupled with the data processing apparatus, and the instructions include instructions that cause the lander to detect an orientation of the lander using data from the gyroscope, and that cause the lander to operate the motor to pivot the lander in accordance with the detected orientation.

7. The lander of claim 6, wherein the mobility mechanism comprises a flywheel brake communicatively coupled with the data processing apparatus, and the instructions include instructions that cause the lander to detect whether or not a current orientation is on a rectangular face of the lander, that cause the lander to operate the motor and the flywheel brake to cause the lander to hop to a new orientation when the current orientation is not on a rectangular face of the lander, and that cause the lander to operate the motor to cause the lander to pivot the lander when the current orientation is on a rectangular face of the lander that is not a correct orientation for the lander.

8. A method comprising:
constructing an instrument lander for an uncontrolled descent to a surface of a solar system body, wherein constructing the instrument lander comprises
excluding any lander-based propulsion system from the instrument lander, and
adding to the instrument lander a mobility mechanism configured and arranged to self-orient the instrument lander on the surface of the solar system body.

9. The method of claim 8, wherein constructing the instrument lander comprises installing a data processing apparatus including a computer-readable medium encoding instructions that cause the instrument lander to perform operations comprising:
operating a motor and a brake of the mobility mechanism to hop the instrument lander to a new orientation when a current orientation is not on a rectangular face of the instrument lander; and
operating at least the motor of the mobility mechanism to pivot the instrument lander when the current orientation is on a rectangular face of the lander that is not a correct orientation for the instrument lander.

10. The method of claim 8, comprising:
constructing a spacecraft to deliver the instrument lander to the solar system body and to release the instrument lander in a descending trajectory to the solar system body based on a gravitational force of the solar system body and solar radiation that serves to slow the instrument lander during at least a portion of the descending trajectory to slow the uncontrolled descent.

11. The method of claim 10, wherein constructing the spacecraft to release the instrument lander comprises installing a data processing apparatus including a computer-readable medium encoding instructions that cause the spacecraft to perform operations comprising:
calculating orbital dynamic information to determine the descending trajectory and a release point, in an orbit of the spacecraft around the solar system body, in accordance with the gravitational force of the solar system body, a total mass of the instrument lander, and an intensity of the solar radiation; and
releasing the instrument lander at the release point in the orbit of the spacecraft around the solar system body.

12. The method of claim 10, wherein constructing the instrument lander comprises building the instrument lander to conform to a satellite form factor that specifies a first length for each of a width and a height of the satellite form factor, and that specifies a second length for a depth of the satellite form factor, wherein the second length is longer than the first length, and a total volume of the first length squared times the second length is less than or equal to 3405 cubic centimeters.

13. The method of claim 10, wherein constructing the instrument lander comprises building the instrument lander to conform to a satellite form factor that specifies a first length for each of a width and a height of the satellite form factor, and that specifies a second length for a depth of the satellite form factor, wherein the second length is longer than the first length, and a total volume of the first length squared times the second length is less than or equal to 2270 cubic centimeters.

14. A method comprising:
designing an instrument lander for an uncontrolled descent to a surface of a solar system body, wherein designing the instrument lander comprises
excluding any lander-based propulsion system from the instrument lander, and
including a space within the instrument lander for a mobility mechanism configured and arranged to self-orient the instrument lander on the surface of the solar system body.

15. The method of claim 14, wherein designing the instrument lander comprises programming the lander to perform operations comprising:
operating a motor and a brake of the mobility mechanism to hop the instrument lander to a new orientation when a current orientation is not on a rectangular face of the instrument lander; and
operating at least the motor of the mobility mechanism to pivot the instrument lander when the current orientation is on a rectangular face of the lander that is not a correct orientation for the instrument lander.

16. The method of claim 14, comprising:
designing a spacecraft to deliver the instrument lander to the solar system body and to release the instrument lander in a descending trajectory to the solar system body based on a gravitational force of the solar system body and solar radiation that serves to slow the instrument lander during at least a portion of the descending trajectory to slow the uncontrolled descent.

17. The method of claim 16, wherein designing the spacecraft to release the instrument lander comprises programming the spacecraft to perform operations comprising:
calculating orbital dynamic information to determine the descending trajectory and a release point, in an orbit of the spacecraft around the solar system body, in accordance with the gravitational force of the solar system body, a total mass of the instrument lander, and an intensity of the solar radiation; and releasing the instrument lander at the release point in the orbit of the spacecraft around the solar system body.

18. The method of claim 16, wherein designing the instrument lander comprises conforming the instrument lander to a satellite form factor that specifies a first length for each of a width and a height of the satellite form factor, and that specifies a second length for a depth of the satellite form factor, wherein the second length is longer than the first length, and a total volume of the first length squared times the second length is less than or equal to 3405 cubic centimeters.

19. The method of claim 16, wherein designing the instrument lander comprises conforming the instrument lander to a satellite form factor that specifies a first length for each of a width and a height of the satellite form factor, and that specifies a second length for a depth of the satellite form factor, wherein the second length is longer than the first length, and a total volume of the first length squared times the second length is less than or equal to 2270 cubic centimeters.

* * * * *